Dec. 31, 1957  C. HOWELL  2,818,157
TRANSFER DEVICE
Filed March 8, 1954   2 Sheets-Sheet 1

INVENTOR
CLARENCE HOWELL

ATTORNEY

Dec. 31, 1957  C. HOWELL  2,818,157
TRANSFER DEVICE

Filed March 8, 1954  2 Sheets-Sheet 2

*INVENTOR*
CLARENCE HOWELL

ATTORNEY

United States Patent Office 2,818,157
Patented Dec. 31, 1957

2,818,157
TRANSFER DEVICE

Clarence Howell, Millville, N. J., assignor to Armstrong Cork Company, Lancaster, Pa., a corporation of Pennsylvania Application March 8, 1954, Serial No. 414,542

2 Claims. (Cl. 198—31)

This invention relates to a device for transferring glassware from one operation to another during the process of manufacture, and more particularly to a device for pushing newly formed glassware from the conveyor leading away from the machine on which it was produced onto the lehr conveyor.

In the past, the device most commonly used to transfer glassware from the manufacturing equipment to the lehr has been tongs, which are lowered over the neck of the glassware, closed, and raised to carry the glassware grasped by the tongs to the lehr conveyor. This system is satisfactory for use in the manufacture of large glassware where the speed of production is such that the tongs type transfer device has sufficient time to take the glassware piece by piece from the processing device and place it on the lehr conveyor. In the production of smaller glassware, such as baby food jars, etc., it has been found desirable to operate at higher production rates, making it impossible to use the conventional tongs type transfer device.

In order to solve this problem, it has been found that a pusher bar device, which pushes the newly formed glassware from a conveyor running at a 90° angle with respect to the lehr conveyor, could be utilized in pushing a plurality of newly formed articles of glassware, arranged in alignment, from the one conveyor to the other conveyor. One of the problems involved in operating a device of this type is the return stroke of the pusher bar which must of necessity be elevated to be returned over the continuous row of articles passing along the conveyor. Then, too, the action of the pusher bar when it contacts the newly formed ware must be slow and uniform so as not to deform the glassware, which is sufficiently plastic at this point to be distorted by an article coming in contact therewith.

The invention covered by this patent application has been developed to perform the operation mentioned above. The device is simple, can be synchronized with the speed of the conveyor, and is easily adjustable to accommodate glassware of different sizes so that regardless of the size and shape of the glassware being manufactured, the pusher bar can be elevated a sufficient amount to be withdrawn over glassware but is not elevated an excessive amount over that required to clear the glassware being produced.

An object of this invention is to provide a pusher bar type transfer device for transferring a continuous line of newly formed glassware from the forming machine to the lehr.

In order to more easily understand the invention, the same will be described in connection with the attached drawings, in which.

Figure 1:
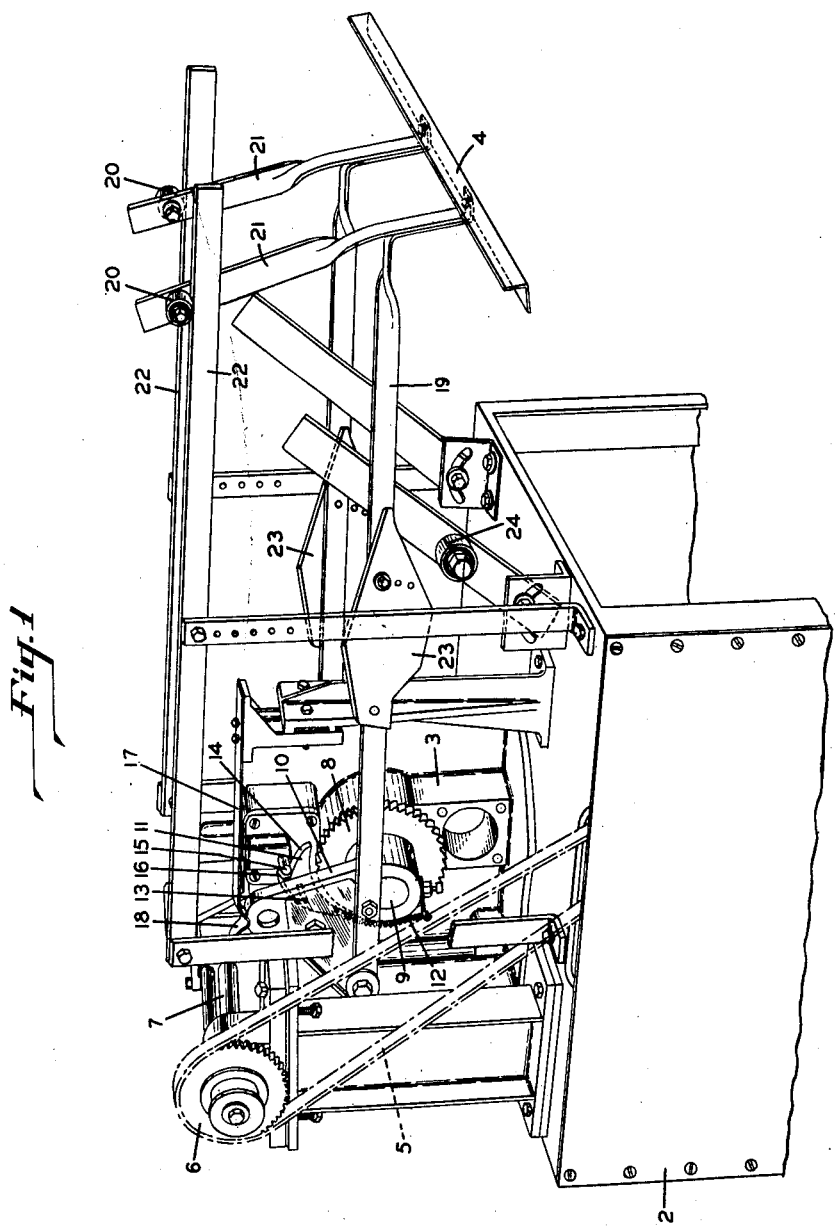
Figure 1 is a side elevational view showing the device of my invention.

Referring to Figure 1, there is shown a base 2 on which is mounted the mechanism shown generally at 3 for actuating the pusher bar 4. The device is operated by a motor, not shown, through chain 5 to the sprocket 6 keyed to shaft 7. In the preferred embodiment here under consideration, a chain and sprocket are shown as the drive mechanism; however, it will be understood that any other driving arrangement, such as a belt and pulley arrangement, is satisfactory. The shaft 7 is connected through a suitable gear train, not shown, to a shaft carrying a ratchet 8. This ratchet 8 is keyed to the shaft and continuously rotates therewith. The shaft carrying the ratchet is hollow and is provided with a freely rotating shaft 9, which is concentric with the ratchet shaft but is free to rotate with respect thereto. Shaft 9 has a crank 10 mounted thereon so that it rotates with the shaft. Crank 10 carries a pawl 11. The arrangement of the crank 10 and the ratchet 8 is such that the pawl 11 carried by the crank 10 is in alignment with the ratchet 8 and can be urged into engagement with the ratchet and withdrawn therefrom. The pawl 11 is urged into engagement with ratchet 8 by means of a spring 12, one end of which is attached to the pawl 11 and the other end of which is attached to the hub of the crank. The pawl 11 is pivotally mounted on the crank 10 by means of a pin 13 in such manner that the pawl pivots about the pin while engaging and disengaging the ratchet. With this arrangement, the tension of the spring 12 pulls the end of the pawl 11 into engagement with the teeth of the ratchet 8.

The top surface of the leading end of the pawl 11 is provided with a cam surface 14. The pawl 11 is withdrawn from engagement with the ratchet 8 by means of a pin 15 so positioned as to impede the path of travel of pawl 11 as it is carried in a circular path with the crank 10. As the pawl 11 approaches the top of its circular path of travel, the cam surface 14 engages pin 15. The contour of the cam surface 14 is such that continued movement of the pawl 11 in its circular path will force the leading end of the pawl 11 down, pivoting the pawl 11 about pin 13, raising the back end thereof out of engagement with the ratchet 8. The forward movement of the pawl 11 is stopped by means of a projection 16 on the pawl 11, which strikes the pin 15. In Figure 1, the pawl 11 is shown in engagement with pin 15 and out of engagement with ratchet 8. When the pawl 11 is not in engagement with the ratchet 8, counterclockwise movement of the crank 10 is prevented by means of a spring 17 which fits into a detent 18 on a projection of the crank 10.

When it is desired to rotate the crank 10, the pin 15 which is in engagement with the projection 16 in the pawl 11 is withdrawn by means of an air cylinder. With the pin 15 withdrawn, pawl 11 is free to pivot about pin 13 and the spring 12 pulls the rear of the pawl 11 into engagement with the ratchet 8. When pin 15 is withdrawn, it compresses a spring, and as soon as the air is shut off after the pawl has passed the pin, the spring forces pin 15 outwardly in position to stop the pawl when it reaches its topmost position.

The timing for the withdrawal of pin 15 is controlled by the speed of the conveyor conveying the glassware from the manufacturing machine to the device here under consideration. The timing is such that when a sufficient quantity of glassware is available to be transferred from the one conveyor to the other, the pin is withdrawn, the crank makes one complete revolution, pushing the glassware from one conveyor to the other as explained hereafter, and the motion of the crank is then halted until a sufficient quantity is available for the next transfer.

It will be understood that on the other end of shaft 9 there is a crank corresponding to crank 10. Both of these cranks are keyed to the same shaft 9 so that rotation of the one will rotate the other. The pawl and ratchet arangement operates only on crank 10, and likewise the mechanism for holding the crank to prevent counterclockwise rotation operates only on crank 10. The pusher arms 19 are attached to the cranks 10 so that rotation of the cranks will push the arms 19 forward to their fullest extent and retract them to their rearmost position, as shown in Figure 1, on one complete revolution. During the forward motion of the arms 19, the rear of the arms will be elevated by reason of the fact that the crank is carrying the point of attachment of the arms in an upwardly direction. In order to prevent the pusher bar 4 from dropping, it is supported by means of rollers 20 on the ends of support members 21 which ride on a horizontal track 22 of the top of the machine. This prevents the pusher bar 4 from dropping below the level desired during the forward movement. On the return movement of the pusher bar 4, the back end of the arms 19 will be lowered and the cams 23 mounted intermediate the arms 19 between the point of attachment to the crank and the pusher bar engage fulcrum points 24. The cams 23 are so contoured that as they pass over the points 24 the pusher bar 4 is raised to an elevation sufficient to clear the glassware moving along the conveyor. The cams 23 are adjustable with respect to the arms 19 to accommodate glassware of different sizes. Also, fulcrum points 24 are adjustable, and by means of these two adjustments, the degree of elevation of the pusher bar may be accurately controlled.

The positioning of the cams 23 on the arms 19 is such that the cams will not engage the fulcrum points 24 immediately upon the start of the return stroke, but instead the pusher bar will be drawn back from the glassware a short distance before it is elevated to clear the glassware on the conveyor. This initial horizontal movement obviates the danger of the glassware being struck as the pusher bar swings through an arc as it is being elevated.

Figure 2:
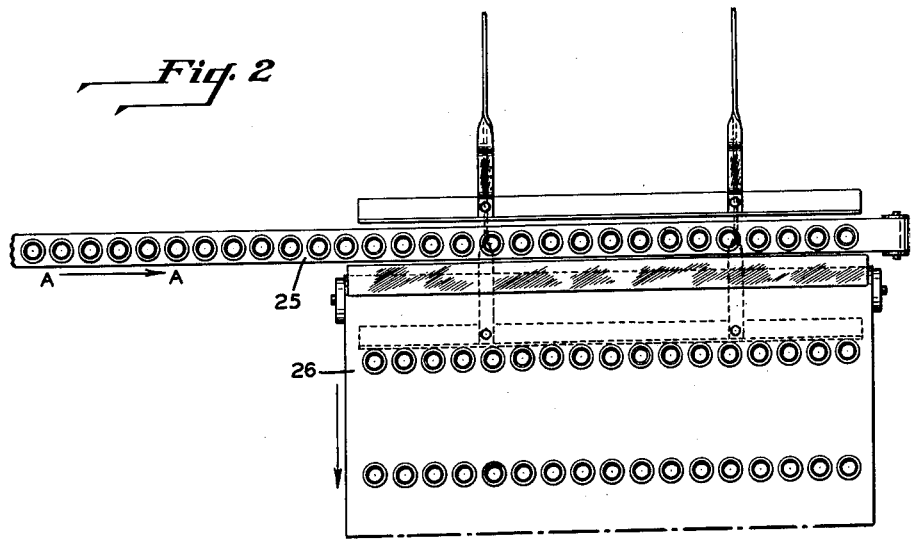
Figure 2 is a top plan view showing the arrangement of conveyors for effecting the transfer of glassware from the forming machine to the lehr by using this device.

Figure 2 shows the relative position of the two conveyors 25 and 26. The conveyor 25 is the one moving away from the forming machine carrying the glassware in the continuous line past the pusher bar 4. The conveyor 26 is on the same level as the conveyor 25 but moving at an angle of 90° with respect thereto. The pusher bar 4 travels in a reciprocatory motion at an angle of 90° with respect to the conveyor 25 and parallel to the direction of the conveyor 26.

In the operation of the device, when the line of glassware traveling in the direction of the arrow A—A (Figure 2) on the conveyor 25 approaches the right-hand end of the pusher bar 4, as shown in Figure 2, a contact switch operates a pneumatic cylinder which withdraws pin 15. This permits spring 12 to pivot pawl 11 about pin 13 until pawl 11 engages the teeth of ratchet 8. Ratchet 8 traveling in a clockwise direction carries with it crank 10 to which pawl 11 is attached. Crank 10 on its initial clockwise movement imparts forward movement to arms 19 which move pusher bar 4 forward at a constant level by reason of rollers 20 rolling on tracks 22. Pusher bar 4 engages the glassware on the conveyor 25 and pushes it from the conveyor 25 onto conveyor 26 operating in a direction parallel to the direction of travel of the pusher bar. After the pusher bar has pushed the glassware onto the conveyor 26, continued clockwise rotary movement of the crank 10 moves the back end of the arms 19 in a downwardly direction, drawing the pusher bar 4 in a rearward direction until the cams 23 engage fulcrum points 24, raising pusher bar 4 to clear the advancing glassware on the conveyor 25. The pin 15 has been returned to its outward position, and as the pawl 11 completes one revolution the leading end of the pawl 11 engages the pin, and by reason of the cam surface the pawl 11 is rotated about the pin 13, raising the pawl away from engagement of the teeth of the ratchet 8, and the projection 16 on the pawl 11 engages pin 15, stopping the motion of the crank 10. The crank is held from counterclockwise movement by means of the spring 17 which fits into a detent 18 in the crank. The assembly is held in this position until a sufficient quantity of articles are available on conveyor 25, at which time the cycle is repeated.

It will be obvious from the above that I have developed a device which is effective for pushing newly formed glassware from one conveyor to another during continuous high speed production of glassware.

I claim:

1. In a device for transferring glassware from one conveyor to another, the combination of a pusher bar, an arm carrying said pusher bar on one end thereof, an intermittently rotated crank operatively connected to the other end of said arm to impart reciprocatory movement to said arm and pusher bar, a continuously rotating ratchet adjacent said crank, a pawl on said crank for engagement with said ratchet, means for urging said pawl into engagement with said ratchet and means for removing said pawl from engagement with said ratchet on each revolution of the crank, a support for said arm positioned intermediate the pusher bar and the crank connection, and a cam surface on said arm intermediate the pusher bar and crank connection for engagement with said support to raise said pusher bar during its path of travel in one direction.

2. In a device for transferring glassware from one conveyor to another, the combination of a pusher bar, an arm carrying said pusher bar on one end thereof, an intermittently rotated crank operatively connected to the opposite end of said arm to impart reciprocatory movement to said arm and pusher bar, a continuously rotating ratchet adjacent said crank, a pawl carried by said crank for engagement with said ratchet, means for urging said pawl into engagement with said ratchet and means for withdrawing said pawl from engagement with said ratchet, means for holding said crank in fixed position while said pawl is not in engagement with said ratchet, a support for said arm positioned intermediate the pusher bar and crank connection, and a cam surface on said arm intermediate the pusher bar and crank connection for engagement with said support to raise said pusher bar during its path of travel in one direction.

References Cited in the file of this patent

UNITED STATES PATENTS

| 1,839,375 | Covey | Jan. 5, 1932 |
| 2,390,725 | McNamara | Dec. 11, 1945 |
| 2,547,791 | Smith | Apr. 3, 1951 |